United States Patent
Zaffou et al.

(10) Patent No.: US 9,647,273 B2
(45) Date of Patent: *May 9, 2017

(54) FLOW BATTERY HAVING ELECTRODES WITH A PLURALITY OF DIFFERENT PORE SIZES AND OR DIFFERENT LAYERS

(71) Applicant: United Technologies Corporation, Hartford, CT (US)

(72) Inventors: Rachid Zaffou, West Hartford, CT (US); Michael L. Perry, Glastonbury, CT (US); Arun Pandy, Enfield, CT (US); Sergei F. Burlatsky, West Hartford, CT (US); Vadim Atrazhev, Moscow (RU)

(73) Assignee: United Technologies Corporation, Farmington, CT (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/807,590

(22) Filed: Jul. 23, 2015

(65) Prior Publication Data
US 2015/0333335 A1    Nov. 19, 2015

Related U.S. Application Data

(63) Continuation of application No. 13/084,156, filed on Apr. 11, 2011, now Pat. No. 9,123,962.

(51) Int. Cl.
*H01M 4/86* (2006.01)
*H01M 8/20* (2006.01)
(Continued)

(52) U.S. Cl.
CPC ......... *H01M 4/861* (2013.01); *H01M 4/8605* (2013.01); *H01M 8/0234* (2013.01);
(Continued)

(58) Field of Classification Search
None
See application file for complete search history.

(56) References Cited

U.S. PATENT DOCUMENTS 5,656,390 A    8/1997    Kageyama et al.
5,851,694 A    12/1998    Miyabayashi et al.
(Continued)

FOREIGN PATENT DOCUMENTS

GB    1383957    2/1974
GB    2341601    3/2000

OTHER PUBLICATIONS

International search report for for PCT/US2012/033101 dated Sep. 27, 2012.
(Continued)

*Primary Examiner* — Miriam Stagg
*Assistant Examiner* — Carmen Lyles-Irving
(74) *Attorney, Agent, or Firm* — O'Shea Getz P.C.

(57) ABSTRACT

A flow battery includes an electrode operable to be wet by a solution having a reversible redox couple reactant. In one embodiment, the electrode can have plurality of micro and macro pores, wherein the macro pores have a size at least one order of magnitude greater than a size of the micro pores. In another embodiment, the electrode includes a plurality of layers, wherein one of the plurality of layers has a plurality of macro pores, and wherein another one of the plurality of layers has a plurality of micro pores. In another embodiment, the electrode has a thickness less than approximately 2 mm. In still another embodiment, the electrode has a porous carbon layer, wherein the layer is formed of a plurality of particles bound together.

14 Claims, 3 Drawing Sheets

(51) Int. Cl.
*H01M 8/0234* (2016.01)
*H01M 8/18* (2006.01)

(52) U.S. Cl.
CPC .......... *H01M 8/188* (2013.01); *H01M 8/20* (2013.01); *H01M 8/18* (2013.01); *Y02E 60/528* (2013.01)

(56) References Cited

U.S. PATENT DOCUMENTS

| | | | |
|---|---|---|---|
| 6,764,789 | B1 | 7/2004 | Sekiguchi |
| 7,078,118 | B2 | 7/2006 | Schrooten et al. |
| 7,265,456 | B2 | 9/2007 | Hennessy |
| 7,309,540 | B2 | 12/2007 | Wang |
| 7,438,986 | B2 | 10/2008 | Shimotori et al. |
| 7,473,485 | B2 | 1/2009 | Burlatsky et al. |
| 7,674,540 | B2 | 3/2010 | Adams et al. |
| 8,057,956 | B2 | 11/2011 | Terada et al. |
| 8,597,856 | B2 | 12/2013 | Akasaka et al. |
| 2003/0108785 | A1 | 6/2003 | Wu et al. |
| 2007/0157922 | A1 | 7/2007 | Radhakrishnan et al. |
| 2008/0090129 | A1 | 4/2008 | Kunz et al. |
| 2009/0014059 | A1 | 1/2009 | Radhakrishnan et al. |
| 2009/0075133 | A1 | 3/2009 | Song et al. |
| 2009/0202885 | A1 | 8/2009 | Kim et al. |
| 2010/0143809 | A1 | 6/2010 | Perry et al. |
| 2010/0216038 | A1 | 8/2010 | Cardenas-Valencia et al. |
| 2012/0203392 | A1 | 8/2012 | Pandy et al. |
| 2012/0299384 | A1 | 11/2012 | Peled et al. |

OTHER PUBLICATIONS

Ge et al. "Study of a High Power Density Sodium Polysulfide/Bromine Energy Storage Cell", Journal of Applied Electrocehmistry 34:181-185, 2004.
Office action for JP 2014-505251 dated Jan. 5, 2016.
Ponce de Leon et al. "Redox Flow Cells for Energy Conversion", Journal of Power Sources 160, May 26, 2006, pp. 716-732.
Ge et al. "Study of a High Power Density Sodium Polysulfide/Bromine Energy Storage Cell", Journal of Applied Electrochemistry 34:181-185, 2004.

FLOW BATTERY HAVING ELECTRODES WITH A PLURALITY OF DIFFERENT PORE SIZES AND OR DIFFERENT LAYERS

CROSS-REFERENCE TO RELATED APPLICATIONS

This application is a continuation of U.S. patent application Ser. No. 13/084,156 filed Apr. 11, 2011, issued as U.S. Pat. No. 9,123,962. This application is related to PCT Application No. PCT/US09/68681 filed on Dec. 18, 2009, U.S. patent application Ser. No. 13/022,285 filed on Feb. 7, 2011 and U.S. patent application Ser. No. 13/023,101 filed Feb. 8, 2011, each of which is incorporated by reference in its entirety.

BACKGROUND OF THE INVENTION

1. Technical Field

This disclosure relates generally to a flow battery and, more particularly, to a flow battery having electrodes with a plurality of different pore sizes and/or different layers.

2. Background Information

A typical flow battery system includes a stack of flow battery cells, each having an ion-exchange membrane disposed between negative and positive electrodes. During operation, a catholyte solution flows through the positive electrode, and an anolyte solution flows through the negative electrode. The catholyte and anolyte solutions each electrochemically react in a reversible reduction-oxidation ("redox") reaction. Ionic species are transported across the ion-exchange membrane during the reactions, and electrons are transported through an external circuit to complete the electrochemical reactions.

The negative and positive electrodes can be constructed from a carbon felt material. Such a carbon felt material typically has a plurality of interstices of substantially uniform size that promote uniform distribution of the electrolyte solution therethrough. Each electrode has a relatively large thickness (e.g., greater than 3.2 millimeters (mm), ~125 thousandths of an inch (mil)) sized to reduce pressure drop across a length of the electrode, which length is substantially perpendicular to the thickness. Such a relatively large electrode thickness, however, can substantially increase resistance to ionic conduction across the thickness of the electrode. Electrodes with relatively large thicknesses, therefore, can increase voltage inefficiency of the flow battery cell due to the increased resistance to ionic conduction, especially when the flow battery cell is operated at relatively high current densities such as greater than 100 milli amps (mA) per square centimeter ($cm^2$) (~645 mA per square inch ($in^2$)).

There is a need in the art, therefore, for a flow battery cell that can operate at relatively high current densities, without significantly increasing voltage inefficiency. Operating at relatively high current densities without excessive voltage losses can permit use of a smaller stack size and, therefore, a lower stack cost for a given power output.

SUMMARY OF THE DISCLOSURE

The present invention includes a flow battery having an electrode (also referred to as an "electrode layer") that is operable to be wet by a solution having a reversible redox couple reactant. According to one aspect of the invention, the electrode has a plurality of micro and macro pores, wherein the macro pores have a size at least one order of magnitude greater than a size of the micro pores. According to another aspect of the invention, the electrode has a plurality of layers. One of the plurality of layers has a plurality of macro pores, and another one of the plurality of layers has a plurality of micro pores. According to another aspect of the invention, the electrode has a thickness less than approximately 2 mm (~78 mil). According to still another aspect of the invention, the electrode has a porous carbon layer, wherein the layer is formed of a plurality of particles bound together.

The foregoing features and operation of the invention will become more apparent in light of the following description and the accompanying drawings.

DETAILED DESCRIPTION OF THE INVENTION

Figure 1:
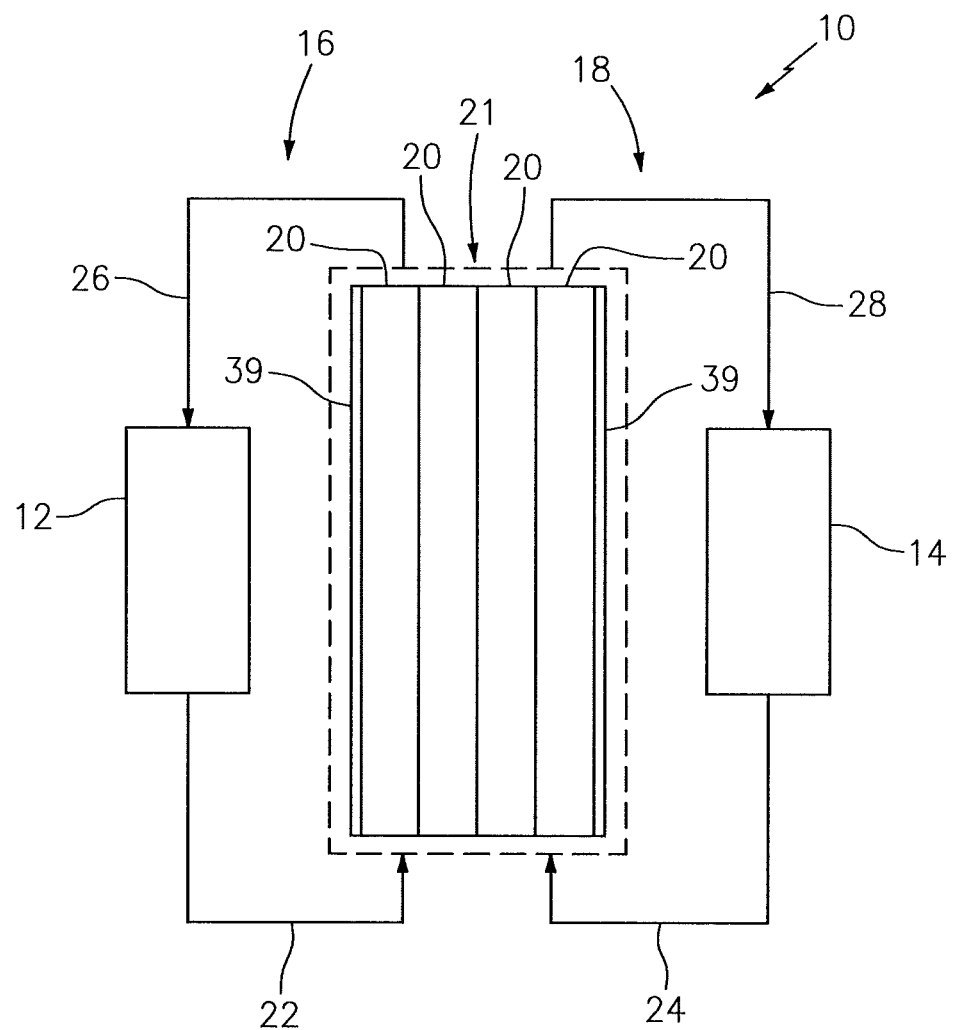
FIG. 1 is a schematic diagram of one embodiment of a flow battery system, which includes a plurality of flow battery cells arranged in a stack.

Referring to FIG. 1, a schematic diagram of a flow battery system 10 is shown. The flow battery system 10 is configured to selectively store and discharge electrical energy. During operation, for example, the flow battery system 10 can convert electrical energy generated by a renewable or non-renewable power system (not shown) into chemical energy, which is stored within a pair of first and second electrolyte solutions (e.g., anolyte and catholyte solutions). The flow battery system 10 can subsequently be operated to convert the stored chemical energy back into electrical energy. Examples of suitable first and second electrolyte solutions include, but are not limited to, vanadium/vanadium electrolyte solutions and bromine/polysulphide electrolyte solutions.

The flow battery system 10 includes a first electrolyte storage tank 12, a second electrolyte storage tank 14, a first electrolyte circuit loop 16, a second electrolyte circuit loop 18, and at least one flow battery cell 20. In some embodiments, the flow battery system 10 can include a plurality of the flow battery cells 20 arranged and compressed into at least one stack 21 between a pair of end plates 39, which cells 20 can be operated to collectively store and produce electrical energy. The flow battery system 10 further includes a control system (not shown) that includes a controller, a power converter/regulator, and first and second electrolyte solution flow regulators (e.g., valves, pumps, etc.), which control system is adapted to control the storage and discharge of electrical energy by the flow battery system.

Each of the first and second electrolyte storage tanks 12 and 14 is adapted to hold and store a respective one of the electrolyte solutions.

The first and second electrolyte circuit loops 16 and 18 each have a source conduit 22, 24 and a return conduit 26, 28, respectively.

Figure 2:
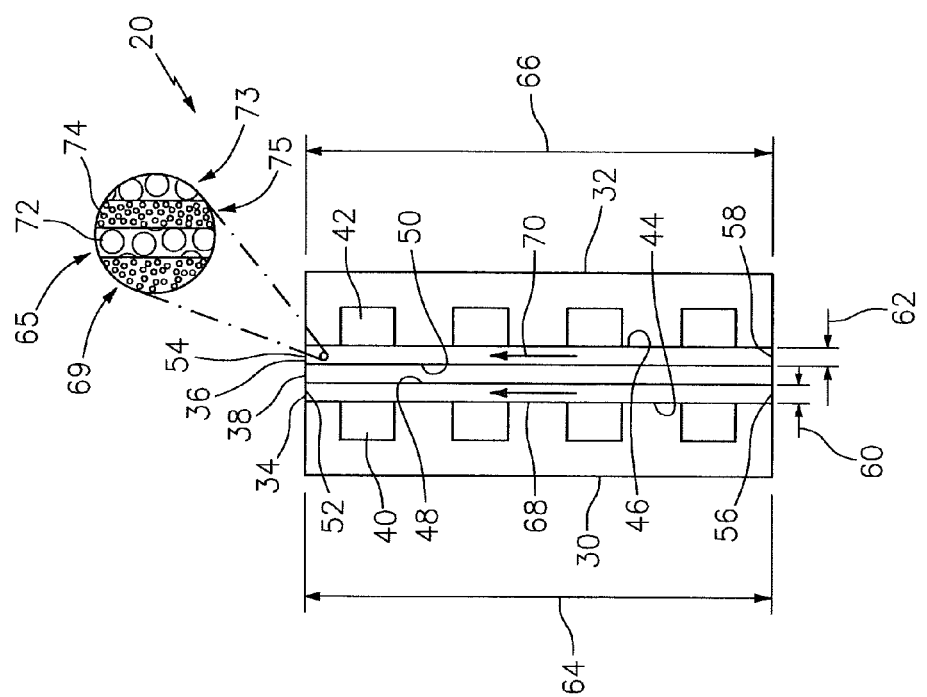
FIG. 2 is a diagrammatic illustration of one embodiment of one of the flow battery cells in FIG. 1, and an enlargement of a section of an electrode layer included in the flow battery cell.

Referring to FIG. 2, a diagrammatic illustration of one embodiment of the flow battery cell 20 is shown. The flow battery cell 20 includes a first current collector 30, a second current collector 32, a first liquid-porous electrode layer 34 (hereinafter "first electrode layer"), a second liquid-porous electrode layer 36 (hereinafter "second electrode layer"), and an ion-exchange membrane layer 38.

Figure 3:
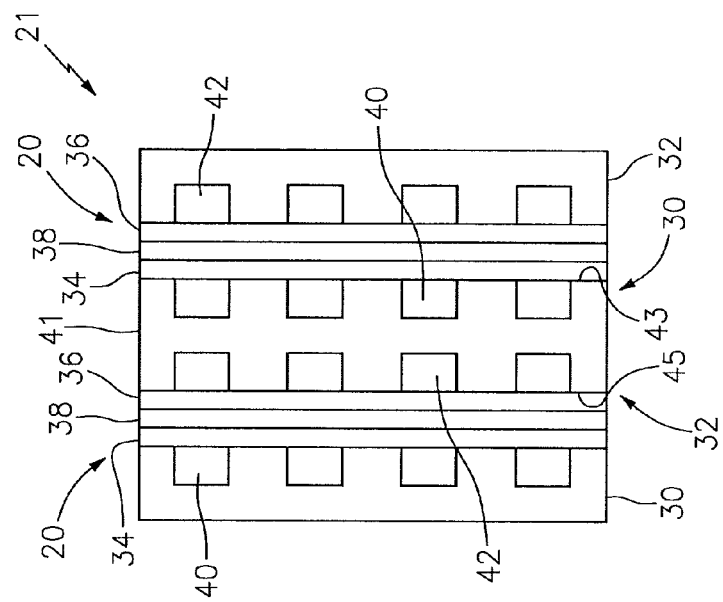
FIG. 3 is a diagrammatic illustration of one embodiment of the stack of flow battery cells in FIG. 1.

The first and second current collectors 30 and 32 are each adapted to transfer electrons to and/or away from a respective one of the first or second electrode layers 34 and 36. Referring to FIG. 3, in some embodiments, one of the first and one of the second current collectors 30 and 32 in the stack 22 can be configured together as a bipolar plate 41. The bipolar plate 41 is adapted to be arranged between adjacent flow battery cells 20 within the stack 21. The bipolar plate 41 extends between a pair of current collector surfaces 43 and 45. A first one of the surfaces, 43, is operable to function as the first current collector 30 for a first one of the cells. A second one of the surfaces, 45, is operable to function as the second current collector 32 for a second one of the cells. Referring again to FIG. 2, each current collector 30, 32 can include a plurality of flow channels 40, 42 having, for example, straight, curved or serpentine geometries. Additional examples of suitable current collector and channel configurations are disclosed in PCT Application No. PCT/US09/68681, which is hereby incorporated by reference in its entirety.

The first and second electrode layers 34 and 36 are each adapted to operate at a relatively high current density (e.g., greater than or equal to approximately 100 mA/cm$^2$, ~645 mA/in$^2$). Each electrode layer 34, 36 has a first surface 44, 46, a second surface 48, 50, a first end 52, 54, a second end 56, 58, a thickness 60, 62 and a length 64, 66, respectively. The thickness 60, 62 extends between the first surface 44, 46 and the second surface 48, 50, respectively. In one embodiment, the thickness 60, 62 is less than approximately 3 mm (~118 mil). In another embodiment, the thickness 60, 62 is less than approximately 2 mm (~78 mil).). The relatively small thickness 60, 62 of each electrode layer 34, 36 significantly reduces resistive ionic transport losses through the electrode layer 34, 36, relative to an electrode layer having a thickness greater than, for example, 3.2 mm (~125 mil). The length 64, 66 extends in a direction along an electrolyte solution flow path 68, 70, between the first end 52, 54 and the second end 56, 58, respectively.

Referring to the enlarged section of the second electrode layer 36 shown in FIG. 2, each electrode layer 34, 36 has a plurality of macro and micro pores 72 and 74 defining an electrode layer volumetric porosity. The term "volumetric porosity" refers herein to a ratio of a volume of the pores (also sometimes referred to as "interstices") in a material to a volume of the layer material. In one embodiment, for example, the macro and micro pores 72 and 74 define a volumetric porosity of less than approximately 9:1, pore volume to material volume. In another embodiment, the macro and micro pores 72 and 74 define a volumetric porosity of less than approximately 7:3, pore volume to material volume. The volumetric porosity can change, however, when each electrode layer 34, 36 is compressed between the ion-exchange membrane layer 38 and a respective one of the current collectors 30, 32 during assembly. The macro and micro pores 72 and 74 can define, for example, a volumetric porosity of between approximately 4:6 and 7:3, pore volume to material volume, after the respective electrode layer has been compressed.

Substantially all of the macro pores 72 have a size that is at least one order of magnitude greater than (i.e., 10$^1$ times) a size of substantially all of the micro pores 74. In another embodiment, the size of substantially all of the macro pores 72 is at least two orders of magnitude greater than (i.e., 10$^2$ times) the size of substantially all of the micro pores 74. The size of each macro pore 72 is selected to reduce pressure drop across the electrode layer 34, 36 and, therefore, facilitate flow of the electrolyte solutions through the respective electrode layers 34 and 36. The size of each micro pore 74, on the other hand, is selected to maintain an adequate electrode surface area for electrochemical interactions between the electrode layers 34 and 36 and the respective electrolyte solutions. In one embodiment, for example, substantially all of the macro pores 72 have a diameter greater than or equal to approximately 100 micrometers (μm) (~3.9 mil), and substantially all of the micro pores 74 have a diameter less than or equal to approximately 1 μm (~39 microinches (μin)).

Figure 4:
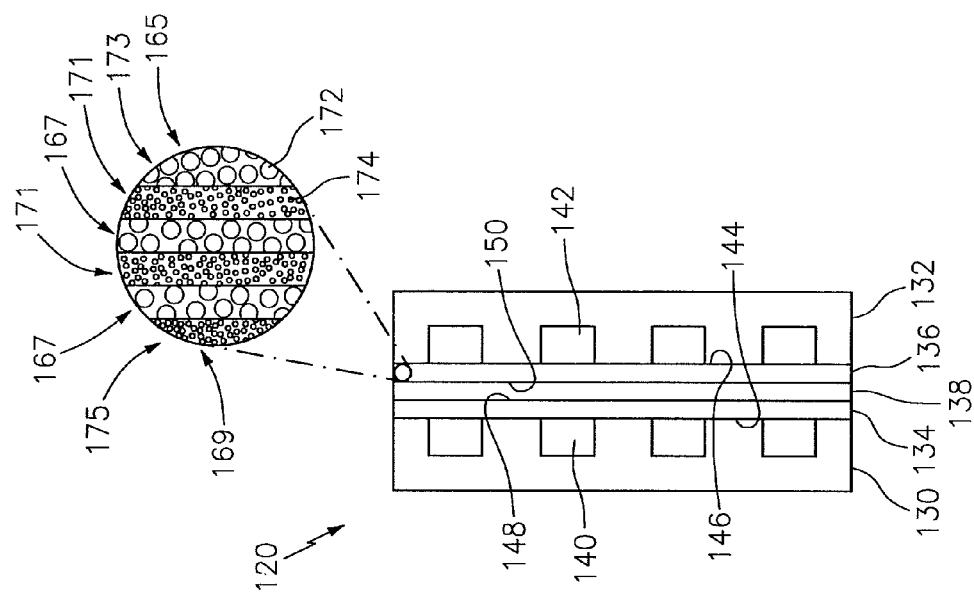
FIG. 4 is a diagrammatic illustration of another embodiment of one of the flow battery cells in FIG. 1, and an enlargement of a section of an electrode layer included in the flow battery cell.

The macro and micro pores 72 and 74 are arranged in a pattern to respectively reduce pressure drop and ionic losses across the electrode layer 34, 36. In the embodiment shown in FIG. 2, for example, the macro and micro pores 72 and 74 are respectively arranged in a plurality of columns 65, 69 that extend along the electrolyte solution flow path 68, 70 between the first end 52, 54 and the second end 56, 58 of each electrode layer 34, 36. The columns 65 of macro pores can each have a substantially equal macro pore density (i.e., the quantity of macro pores per unit volume of the layer) such that the macro pores 72 are uniformly distributed in each electrode layer 34, 36. Similarly, the columns 69 of micro pores can each have a substantially equal micro pore density (i.e., the quantity of micro pores per unit volume of the layer) such that the micro pores 74 are also uniformly distributed in each electrode layer 34, 36. Alternatively, as shown in the embodiment in FIG. 4, the macro and/or micro pores 172 and 174 can be non-uniformly distributed in each electrode layer 134, 136. The column 165 of macro pores 172 adjacent to the first surface 144, 146 of each electrode layer 134, 136, for example, can have a higher macro pore density than the columns 167 of macro pores proximate the second surface 148, 150 in order to reduce pressure drop adjacent the first surface 144, 146. The column 169 of micro pores 174 adjacent the second surface 148, 150 of each electrode layer 134, 136, on the other hand, can have a higher micro pore density than the columns 171 of micro pores proximate the first surface 144, 146 in order to increase (e.g., maximize) electrode surface area for electrochemical interactions with the respective electrolyte solutions in these regions. Increasing the electrode surface area can increase the density of the redox reactions that occur near the second surface 148, 150 of each electrode layer 134, 136 and thereby reduce ionic losses in the cell 120.

Referring again to FIG. 2, the macro and micro pores 72 and 74 can be arranged in the aforesaid patterns, for example, by forming each electrode layer 34, 36 from a plurality of electrode sub-layers 73 and 75. A first one of the electrode sub-layers 73, for example, can be formed to include a plurality of the macro pores 72. A second one of the electrode sub-layers 75, on the other hand, can be formed to include a plurality of the micro pores 74.

Each electrode layer 34, 36 can be constructed from a mixture of a solid electronic conductor, a solvent, a pore former and a binder. The solid electronic conductor can include mixtures of metals, graphite or carbon particles, phenolic resin powder, cellulose fiber and/or carbon or graphite fibers. The graphite or carbon particles powder can include at least one of carbon fibers and spherical carbon particles. In one embodiment, for example, a carbon power such as Vulcan XC-72 (manufactured by Cabot Corporation of Boston, Mass., United States), a solvent such as isopropanol, a pore former such as ammonium carbonate or polystyrene, and a binder such as a polymer or a resin are mixed together into an electrode ink. If the binder is hydrophobic, then it can be treated in a subsequent process to make it more hydrophilic, or alternatively, the binder can be subsequently heat treated to remove substantially all of the binder; e.g., carbonization can be utilized to form a carbon-carbon composite layer. Alternatively, a hydrophilic binder can be included in the electrode ink, which can include an ion-exchange polymer, or ionomer, such as a sulfonated tetrafluoroethylene based fluoropolymer-copolymer or perfluorosulfonic acid (PFSA) (e.g., Nafion® polymer manufactured by DuPont of Wilmington, Del., United States). The ionomer (e.g., PFSA or any other type of ion-exchange polymer) is used as a binder and a supporting electrolyte for transport of ionic species in the electrode layer. The ionomer can be mixed within the electrode ink such that it is uniformly or non-uniformly distributed along the length of the electrode layer. The electrode ink mixture can also include an electrochemical catalyst. The electrochemical catalyst is selected to promote certain reduction-oxidation ("redox") reactions in the electrolyte solutions. Examples of such an electrochemical catalyst include metals that can be supported or unsupported on a conductive support, such as carbon, to enhance the surface area of the catalyst. Examples of supported metal electrochemical catalysts include a nickel catalyst dispersed on carbon (Ni/C), and a platinum catalyst dispersed on carbon (Pt/C). The electrochemical catalysts can be mixed within the electrode ink such that it is uniformly or non-uniformly distributed along the length of the electrode layer.

An electrode sub-layer structure for promoting reactant distribution can be formed by adjusting a by-weight ratio of the pore former to the other ingredients by itself, or in combination with adjusting the size of the carbon powder particles. The electrode sub-layer can be formed, for example, with a relatively high porosity and, therefore, a relatively large number of macro or micro pores by including a relatively high by-weight ratio of the pore former in the electrode ink. The electrode ink is applied (e.g., sprayed or printed) onto a desired surface (e.g., a surface of the ion-exchange membrane layer or a decal) to form one of the electrode sub-layers 73 or 75. Additional sub-layers can be formed on or attached to the previously formed sub-layer to construct one of the electrode layers 34 or 36. The pore former can be removed (e.g., dissolved) from the electrode layer, for example, using a solvent wash (e.g., a hydrofluoric acid). In embodiments where the electrode ink does not include hydrophilic material (e.g., Nafion® polymer manufactured by DuPont of Wilmington, Del., United States), each electrode sub-layer or layer can be subjected to additional treatments (e.g., chemical or electrochemical oxidation) to provide hydrophilic properties. Heat treatment processes can also be used to convert carbon species to more graphitic forms, which have improved corrosion resistance.

Figure 5:
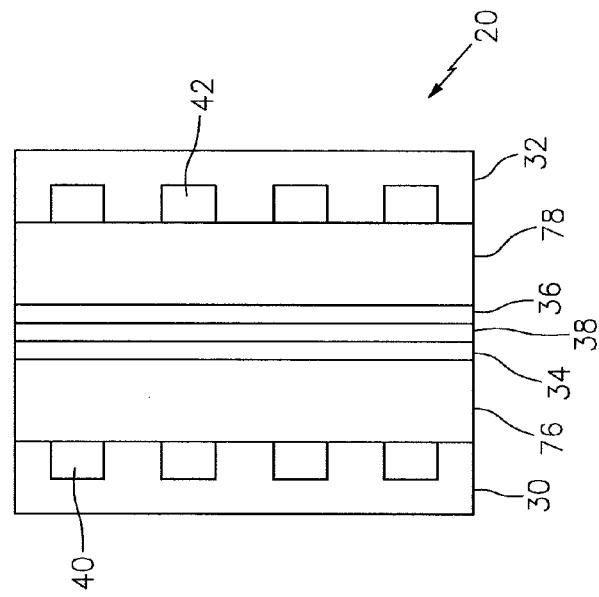
FIG. 5 is a diagrammatic illustration of another embodiment of one of the flow battery cells in FIG. 1.

Referring to FIG. 5, in some embodiments, each electrode layer 34, 36 is coupled to a backing layer 76, 78. The backing layer 76, 78 is adapted to (i) provide mechanical support to the electrode layer 34, 36, (ii) improve uniform distribution of the electrolyte solution to the electrode layer 34, 36, and (iii) provide a temporary electrolyte solution reservoir and/or additional surface area to complete the redox reactions during rapid start up and transient conditions. The backing layer 76, 78 can be constructed from a hydrophilic porous carbon layer such as, but not limited to, a layer made from Toray® fibers (manufactured by Toray Industries of Tokyo, Japan), carbon papers, carbon felts, or carbon cloths. In aforesaid embodiment, the electrode layers 34, 36 can be formed onto the backing layers.

In other embodiments (not shown), each electrode layer 34, 36 includes at least one hydrophilic porous carbon layer having relatively large and uniform pore sizes. Examples of such a hydrophilic porous carbon layer include carbon papers, carbon felts, or carbon cloths. The hydrophilic porous carbon layer is impregnated with relatively small particles to form an electrode layer with bi-modal pore sizes; i.e., an electrode layer with macro and micro pores. Inks of the particles, solvents, and binders may be used to impregnate and bond the particles throughout the each electrode layer. By constructing the electrode layers with the aforesaid technique, each electrode layer can be constructed with substantially uniformly distributed macro and micro pores. The aforesaid impregnated electrode layer can also be combined with a backing layer as shown in FIG. 5.

Referring again to FIG. 2, the ion-exchange membrane layer 38 is configured to be permeable to certain non-redox couple reactants (also referred to as "charge transport ions" or "charge carrier ions") such as, for example, protons (or $H^+$ ions) of vanadium electrolyte solutions in acid. The ion-exchange membrane layer 38 is also configured to be substantially impermeable to certain redox couple reactants (also referred to as "non-charge transport ions" or "non-charge carrier ions") such as, for example, $V^{4+/5+}$ ions or $V^{2+/3+}$ ions of the vanadium electrolyte solutions in acid. Examples of other redox couple reactants include, but are not limited to, $Fe^{2+/3+}$, $Cr^{2+/3+}$, $Br-/Br_3^-$, $S_2^{2-}/S_4^{2-}$ in acidic or basic solutions.

The ion-exchange membrane layer 38 is disposed between the first and second electrode layers 34 and 36. In one embodiment, for example, the first and second electrode layers 34 and 36 are formed on the ion-exchange membrane layer 38, or the first and second electrode layers 34 and 36 are hot pressed (e.g., from decals) onto opposite sides of the ion-exchange membrane layer 38 to attach and increase surface interface between the aforesaid layers 34, 36 and 38. In another embodiment, the first and second electrode layers 34 and 36 are bonded onto opposite sides of the ion-exchange membrane layer 38 with, for example, the aforementioned ionomer, which can also increase the interfacial surface area between the membrane and the electrode layer. The first and second electrode layers 34 and 36 are disposed between the first and second current collectors 30 and 32. Referring to FIG. 5, each electrode layer 34, 36 can be connected to the respective current collector 30, 32 by a respective backing layer 76, 78. Referring again to FIG. 2, each electrode layer 34, 36 can be compressed between the ion-exchange membrane layer 38 and a respective one of the current collectors 30, 32 such that its thickness 60, 62 is reduced by at least 40% to further increase interfacial surface area between the layers.

Referring to FIGS. 1 and 2, the flow battery cells 20, as indicated above, are arranged and compressed into a stack 21 between the pair of end plates 39. The source conduit 22 of the first electrolyte circuit loop 16 fluidly connects the first electrolyte storage tank 12 to one or both of the first current collector 30 and the first electrode layer 34 of each flow battery cell 20. The return conduit 26 of the first electrolyte circuit loop 16 reciprocally fluidly connects the first current collector 30 and/or the first electrode layer 34 of each flow battery cell 20 to the first electrolyte storage tank 12. The source conduit 24 of the second electrolyte circuit loop 18 fluidly connects the second electrolyte storage tank 14 to one or both of the second current collector 32 and the second electrode layer 36 of each flow battery cell 20. The return conduit 28 of the second electrolyte circuit loop 18 reciprocally fluidly connects the second current collector 32 and/or the second electrode layer 36 of each flow battery cell 20 to the second electrolyte storage tank 14.

Referring still to FIGS. 1 and 2, during operation of the flow battery system 10, the first electrolyte solution is circulated (e.g., via a pump) between the first electrolyte storage tank 12 and the flow battery cells 20 through the first electrolyte circuit loop 16. More particularly, the first electrolyte solution is directed through the source conduit 22 of the first electrolyte circuit loop 16 to the first current collector 30 of each flow battery cell 20. The first electrolyte solution flows through the channels 40 in the first current collector 30, and permeates into and out of the first electrode layer 34 through the macro and micro pores 72 and 74; i.e., wetting the first electrode layer 34. The permeation of the first electrolyte solution through the first electrode layer 34 can result from diffusion or forced convection, such as disclosed in PCT Application No. PCT/US09/68681, which can facilitate relatively high reaction rates for operation at relatively high current densities. The return conduit 26 of the first electrolyte circuit loop 16 directs the first electrolyte solution from the first current collector 30 of each flow battery cell 20 back to the first electrolyte storage tank 12.

The second electrolyte solution is circulated (e.g., via a pump) between the second electrolyte storage tank 14 and the flow battery cells 20 through the second electrolyte circuit loop 18. More particularly, the second electrolyte solution is directed through the source conduit 24 of the second electrolyte circuit loop 18 to the second current collector 32 of each flow battery cell 20. The second electrolyte solution flows through the channels 42 in the second current collector 32, and permeates into and out of the second electrode layer 36 through the macro and micro pores 72 and 74; i.e., wetting the second electrode layer 36. As indicated above, the permeation of the second electrolyte solution through the second electrode layer 36 can result from diffusion or forced convection, such as disclosed in PCT Application No. PCT/US09/68681, which can facilitate relatively high reaction rates for operation at relatively high current densities. The return conduit 28 of the second electrolyte circuit loop 18 directs the second electrolyte solution from the second current collector 32 of each flow battery cell 20 back to the second electrolyte storage tank 14.

During an energy storage mode of operation, electrical energy is input into each flow battery cell 20 through the current collectors 30 and 32. The electrical energy is converted to chemical energy through electrochemical reactions in the first and second electrolyte solutions, and the transfer of non-redox couple reactants from, for example, the first electrolyte solution to the second electrolyte solution across the ion-exchange membrane layer 38. The chemical energy is then stored in the electrolyte solutions, which are respectively stored in the first and second electrolyte storage tanks 12 and 14. During an energy discharge mode of operation, on the other hand, the chemical energy stored in the electrolyte solutions is converted back to electrical energy through reverse electrochemical reactions in the first and second electrolyte solutions, and the transfer of the non-redox couple reactants from, for example, the second electrolyte solution to the first electrolyte solution across the ion-exchange membrane layer 38. The electrical energy regenerated by the flow battery cell 20 passes out of the cell through the current collectors 30 and 32.

While various embodiments of the present invention have been disclosed, it will be apparent to those of ordinary skill in the art that many more embodiments and implementations are possible within the scope of the invention. Each electrode layer, for example, can include one or more additional types of pores other than the aforedescribed macro and micro pores. Accordingly, the present invention is not to be restricted except in light of the attached claims and their equivalents.

What is claimed is:

1. A flow battery, comprising:
   an electrode layer including at least one macro pore sub-layer substantially defined by macro pores, and at least one micro pore sub-layer substantially defined by micro pores, wherein the macro pores have a size at least one order of magnitude greater than a size of the micro pores;
   wherein the macro pore sub-layer and micro pore sub-layer each defines a solution flow path through the electrode layer;
   wherein the solution flow path through the macro pore sub-layer is configured to provide a first pressure drop for a solution flow, and the solution flow path through the micro pore sub-layer is configured to provide a second pressure drop for the solution flow, and the first pressure drop is less than the second pressure drop;
   wherein the electrode layer is defined by a thickness that extends between a first surface and a second surface;
   wherein the at least one macro pore sub-layer includes a first macro pore sub-layer and a second macro pore sub-layer; and
   wherein the first macro pore sub-layer has a first density of macro pores and the second macro pore sub-layer has a second density of macro pores, wherein the first and second densities are different.

2. The flow battery of claim 1, wherein the macro pore sub-layer is independent of and contiguous with the micro pore sub-layer.

3. The flow battery of claim 1, wherein the sub-layers extend lengthwise between a first end of the electrode layer and a second end of the electrode layer.

4. The flow battery of claim 1, further comprising:
   a current collector adapted to transfer electrons to and away from the electrode layer; and
   an ion-exchange membrane layer disposed between the electrode layer and a second electrode layer.

5. The flow battery of claim 4 further comprising a solution, which solution includes a reversible redox couple reactant.

6. The flow battery of claim 1, wherein the first surface is adjacent a current collector and the second surface is adjacent an ion-exchange membrane layer, and the first macro pore sub-layer is disposed between the second macro pore sub-layer and the first surface.

7. The flow battery of claim 1, wherein the at least one micro pore sub-layer includes a first micro pore sub-layer and a second micro pore sub-layer.

8. The flow battery of claim 7, wherein the first micro pore sub-layer has a first density of micro pores and the second micro pore sub-layer has a second density of micro pores, wherein the first and second densities are different.

9. The flow battery of claim 8, wherein the first surface is adjacent a current collector and the second surface is adjacent an ion-exchange membrane layer, and the first micro pore sub-layer is disposed between the second micro pore sub-layer and the second surface.

10. The flow battery of claim 1, wherein the electrode layer has a thickness of less than 2 millimeters.

11. The flow battery of claim 1, wherein at least one of the macro pore sub-layer and the micro pore sub-layer has a volumetric porosity of less than 9:1, pore volume to material volume.

12. The flow battery of claim 1, wherein at least one of the macro pore sub-layer and the micro pore sub-layer has a volumetric porosity of less than 7:3, pore volume to material volume.

13. The flow battery of claim 12, wherein the macro pores have a size at least two orders of magnitude greater than a size of the micro pores.

14. A flow battery, comprising:
an electrode layer including at least one macro pore sub-layer substantially defined by macro pores, and at least one micro pore sub-layer substantially defined by micro pores, wherein the macro pores have a size at least one order of magnitude greater than a size of the micro pores;

wherein the macro pore sub-layer and micro pore sub-layer each defines a solution flow path through the electrode layer;

wherein the solution flow path through the macro pore sub-layer is configured to provide a first pressure drop for a solution flow, and the solution flow path through the micro pore sub-layer is configured to provide a second pressure drop for the solution flow, and the first pressure drop is less than the second pressure drop;

wherein the electrode layer is defined by a thickness that extends between a first surface and a second surface;

wherein the at least one micro pore sub-layer includes a first micro pore sub-layer and a second micro pore sub-layer; and wherein the first micro pore sub-layer has a first density of micro pores and the second micro pore sub-layer has a second density of micro pores, wherein the first and second densities are different.

* * * * *